United States Patent [19]

Gresswell

[11] Patent Number: 4,903,451
[45] Date of Patent: Feb. 27, 1990

[54] MODULAR SYSTEM AND FASTENING DEVICES THEREFOR

[75] Inventor: Patrick Gresswell, Welwyn, England
[73] Assignee: Gressco, Ltd., Madison, Wis.
[21] Appl. No.: 257,962
[22] Filed: Oct. 14, 1988
[51] Int. Cl.$^4$ ............................................. A47B 47/00
[52] U.S. Cl. ..................................... 52/584; 312/111; 312/257.1; 446/123
[58] Field of Search .................. 52/584; 411/383, 384, 411/388, 389, 338, 339; 446/85, 87, 113, 123, 122; 312/257 R, 111

[56] References Cited

U.S. PATENT DOCUMENTS

| | | | |
|---|---|---|---|
| 1,194,792 | 8/1916 | Stewart | 411/338 |
| 3,563,624 | 2/1971 | Stice | 312/111 |
| 3,689,075 | 9/1972 | Adelsohn | 446/85 |
| 4,253,509 | 3/1981 | Collet | 411/339 |
| 4,389,808 | 6/1983 | Podell et al. | 446/123 |
| 4,710,096 | 12/1987 | Erlam | 411/338 |

FOREIGN PATENT DOCUMENTS

| | | | |
|---|---|---|---|
| 276782 | 8/1962 | Australia | 52/484 |
| 2538868 | 7/1984 | France | 312/257 R |
| 135671 | 12/1929 | Switzerland | 411/338 |
| 2019212 | 10/1979 | United Kingdom | 312/257 R |

Primary Examiner—Michael Safavi
Attorney, Agent, or Firm—Henry R. Lerner

[57] ABSTRACT

A modular system includes a plurality of building units, each having at least one countersunk aperture for alignment with a countersunk aperture of another building unit; and fastening devices for securing the building units together in any of a plurality of configurations to form the modular system, each fastening device including a first bolt for engagement within a first countersunk aperture such that the upper surface of the first bolt is substantially flush with the inner surface of the wall of the building unit containing the respective countersunk aperture, a second bolt for engagement within a second countersunk aperture that is in alignment with the first countersunk aperture such that the upper surface of the second bolt is substantially flush with the inner surface of the wall of the building unit containing the respective countersunk aperture, and a nut positioned within the first and second countersunk apertures for securing the first and second bolts together.

15 Claims, 3 Drawing Sheets

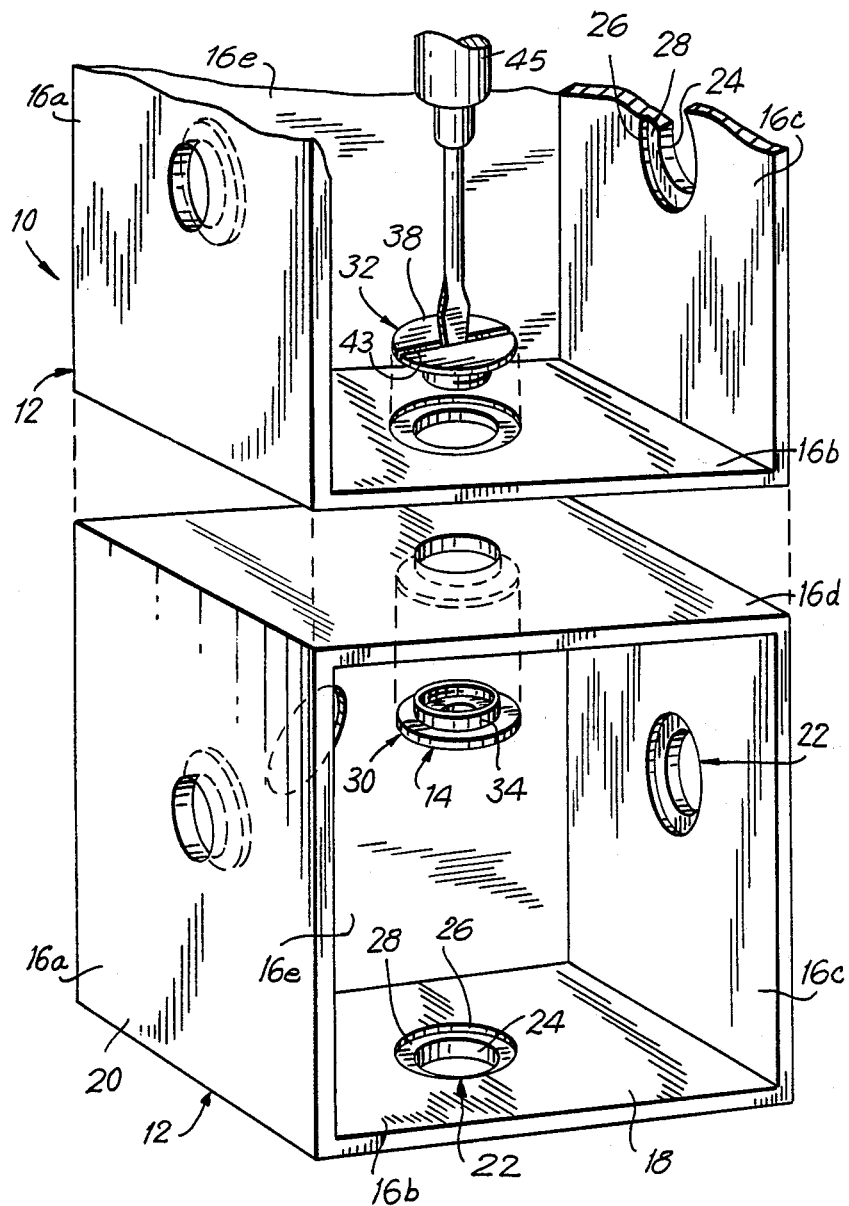

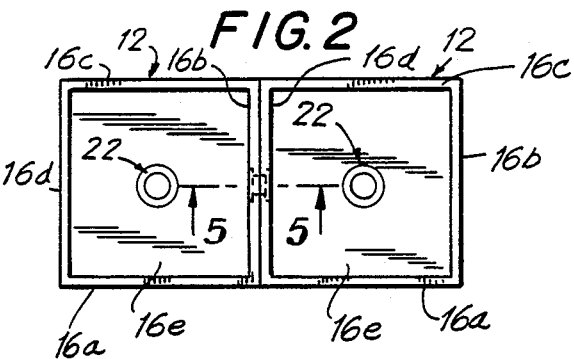
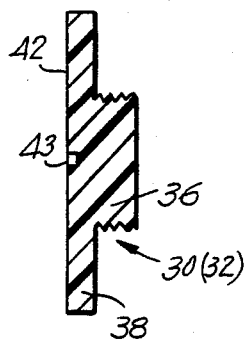
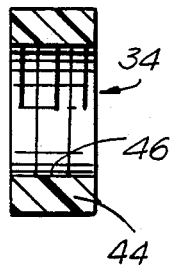
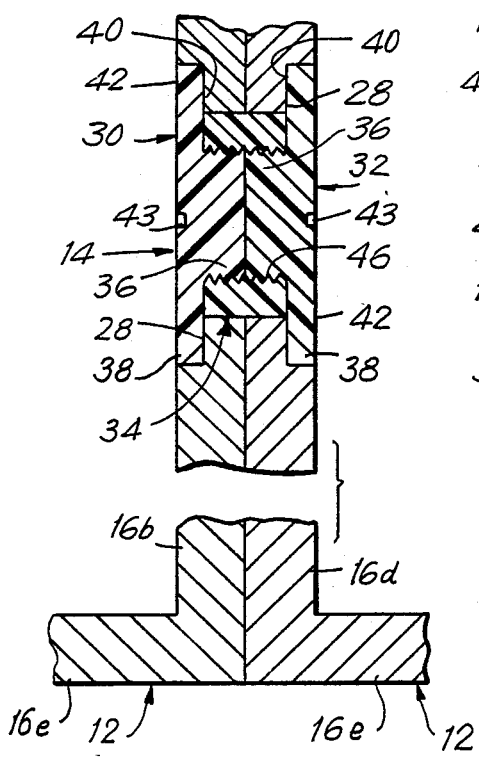

MODULAR SYSTEM AND FASTENING DEVICES THEREFOR

BACKGROUND OF THE INVENTION

The present invention relates generally to a modular system, and more particularly, is directed to a structure constructed from modular units and fastening devices for assembling the modular units together.

Furniture and similar structures are generally sold as a unitary assembly. As a result, must space must be provided for shipping and storing such furniture, and at the point of sale of such furniture. This, however, is costly and inefficient. Although various pieces of furniture are presently sold in knock down or disassembled form, it is relatively complicated and time consuming to assembly such furniture.

OBJECTS AND SUMMARY OF THE INVENTION

Accordingly, it is an object of the present invention to provide a modular system constructed from a plurality of modular building units and fastening devices for securing the building units together.

It is another object of the present invention to provide such a modular system in which the building units can be assembled in any of a plurality of different configurations.

It is still another object of the present invention to provide such a modular system that is sturdy.

It is yet another object of the present invention to provide such a modular system that can be easily and quickly constructed.

It is a further object of the present invention to provide such a modular system that is inexpensive to manufacture and use, and can be shipped in knocked down form.

It is still a further object of the present invention to provide such a modular system in which the bolts of each fastening device are identical, thereby reducing manufacturing, shipping and storing costs.

It is a yet further object of the present invention to provide such a modular system in which the width of the two planar walls secured together is not increased by the fastening device securing the walls together.

In accordance with an aspect of the present invention, a modular system includes a plurality of building units, each having at least one countersunk aperture for alignment with a countersunk aperture of another building unit; and fastening means for securing the building units together in a selected one of a plurality of configurations to form the modular system, the fastening means including a plurality of fastening devices, each including first bolt means for engagement within a first countersunk aperture, second bolt means for engagement within a second countersunk aperture that is in alignment with the first countersunk aperture, and nut means positioned within the first and second countersunk apertures for securing the first and second bolt means together.

In accordance with another aspect of the present invention, a fastening device for securing two planar walls together in surface to surface contacting relation without increasing the combined width of the walls, with each wall having an aperture, includes first bolt means for engagement within a first aperture in one planar wall; second bolt means for engagement within a second aperture in the other planar wall that is in alignment with the first aperture; and nut means positioned within the first and second apertures for securing the first and second bolt means together.

The above and other objects, features and advantages of the present invention will become readily apparent from the following detailed description thereof which is to be read in connection with the accompanying drawings.

BRIEF DESCRIPTION OF THE DRAWINGS

FIG. 1 is an exploded view, in perspective, showing two modular building units and a fastening device of the modular system according to one embodiment of the present invention;

FIG. 2 is a front elevational view of the modular units and fastening device of FIG. 1, in assembled condition;

FIG. 3 is a cross-sectional view of one bolt of the fastening device of FIG. 1;

FIG. 4 is a cross-sectional view of the nut of the fastening device of FIG. 1;

FIG. 5 is a cross—sectional view of the assembled modular building units and fastening device of FIG. 2, taken along line 5—5 thereof;

FIG. 6 is a cross-sectional view similar to FIG. 5, of assembled modular units and a fastening device according to another embodiment of the present invention;

DETAILED DESCRIPTION OF THE PREFERRED EMBODIMENTS

Figure 7:
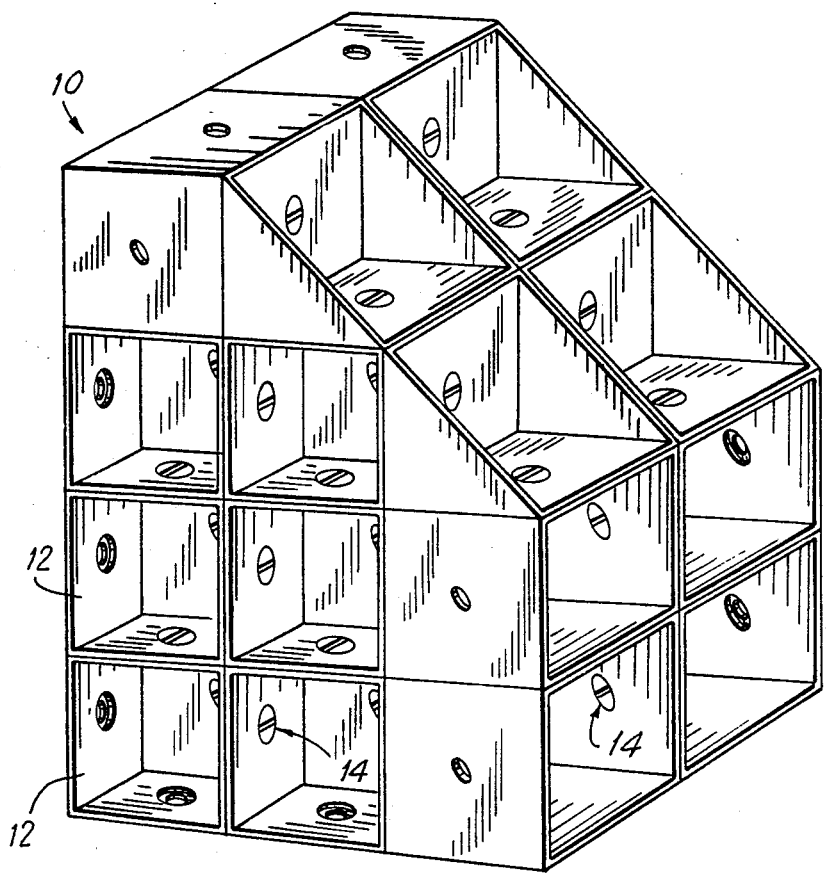
FIG. 7 is a perspective view of a modular system according to one embodiment of the present invention in assembled condition, showing different modular building units that can be used.

Referring to the drawings in detail, a modular system 10 according to the present invention is formed from a plurality of modular building units 12 which are secured together by fastening devices 14. Although modular system 10 is shown in FIG. 7 as a bookcase, it will be appreciated that modular system 10 can take any other suitable configuration, such as a seat, a storage area, or the like. Also, modulator building units 14, although shown as having cubic and triangular (half cubic) configurations, can take any other suitable form, such as octagonal or the like. For ease of explanation of the invention, only the cubic building blocks 14 will be described hereinafter.

Specifically, each cubic modular building blocks 14 includes four square side walls 16a-16d, assembled end to end and perpendicular to each other, with the front of building block 14 being open and the rear closed by an end wall 16e. Each wall 16a-16e therefore has an inner surface 18 and an outer surface 20.

A countersunk aperture 22 is formed through each wall 16a-16e. Preferably, each countersunk aperture 22 is formed at the geometric center of walls 16a-16e, although the present invention is not limited thereby. Each countersunk aperture 22 includes a first through bore section 24 having a first diameter, and a second through bore section 26 having a second larger diameter and contiguous with first through bore section 24. In this regard, an annular shoulder 28 is formed between first and second through bore sections 24 and 26, annular shoulder 28 being parallel to inner and outer surfaces 18 and 20 of the respective wall 16a-16e. In accordance with the present invention, second through bore sections 26 are formed adjacent to inner walls 18, while first through bore sections 24 are formed adjacent to outer walls 20.

Each fastening device 14 includes two bolts 30 and 32, and a securing nut 34, each preferably formed from a sturdy plastic material in an injection molding operation. Bolts 30 and 32 are identical to each other, and accordingly, it is only necessary to construct one type of bolt and one type of nut for each modular system 10. This reduces the manufacturing, shipping and storing costs.

Figure 8:
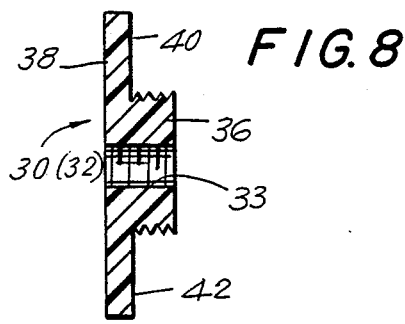
FIG. 8 is a cross-sectional view of one bolt according to another embodiment of the present invention for use with the fastening device of FIG. 1.

Specifically, each bolt 30 and 32 is formed with a threaded shaft 36 and an enlarged head 38 formed at one end of shaft 36. Bolts 30 and 32 are dimensioned such that the diameter of shaft 36 is smaller than the first diameter of first through bore section 24, and is spaced from the inner wall of first through bore section 24 when assembled therein. Further, enlarged head 38 has an outer diameter that is substantialy equal to the second diameter of second through bore section 26 so that the inner surface 40 of enlarged head 38 sits on annular shoulder 28 when bolt 30 or 32 is fit within a countersunk aperture 22. In addition, enlarged head 38 has a height substantially equal to the height of second through bore section 26 so that the outer surface 42 is substantially flush with the inner surface 18 of the respective wall 16a-16e when assembled in a countersunk aperture 22. It will be appreciated that when bolts 30 and 32 are formed in an injection molding operation, a through bore 33 is preferably formed therethrough, as shown in the modified block of FIG. 8, although this is not necessary.

Nut 34 is configured as a conventional nut, that is, by an annular wall 44 having internal threads 46. The outer diameter of nut 34 is substantially equal to the inner diameter of each first through bore section 26.

In assembling two modular building units 12 together, one countersunk aperture 22 of one building unit 12 is positioned in alignment with one countersunk aperture 22 of the other building unit 12, with the outer surfaces 20 of the respective walls 16a-16e containing the aligned countersunk apertures 22 being in abutting contact. Then, one bolt 30 is assembled with one nut 34 to form a nut sub-assembly with an enlarged head, as shown in FIG. 1, such that one end face of nut 34 is preferably in contact with the inner surface 40 of bolt 30. The nut sub-assembly is then inserted through one countersunk aperture 22 such that the outer surface 42 of enlarged head 38 of bolt 30 is substantially flush with the respective outer surface 20.

The other bolt 32 is then inserted through the other aligned countersunk aperture 22 and threadedly connected with nut 34. In this regard, the upper surfaces 42 of bolts 30 and 32 preferably each have a diametrical slot 43 for receipt of a screw driver 45 to tigthen fastening device 14. When so assembled, the opposite end of nut 34 will preferably be in contact with the inner surface 40 of enlarged head 38 of bolt 32. In this manner, the height of nut 34 is dimensioned to produce this result. It will therefore be appreciated that, as shown in FIG. 6, when the width of the walls 16a-16e is increased, and therefore the height of each countersunk aperture 22 is increased, the height of each nut 34 must also be increased so that the ends thereof abut against the inner surfaces 40 of enlarged heads 38 of bolts 30 and 32, in order to obtain a more secure assembly.

It will therefore be appreciated that the present invention provides a modular system 10 that can be easily assembled in any of a plurality of different configurations from modular building units 12 in an easy manner. Further, fastening devices 14 provide a quick and inexpensive manner of securing building units 12 together, with fastening devices 14 being hidden within countersunk apertures 22 so as not to obstruct the use or aesthetic appearance of modular system 10. Thus, when two walls are assembled together in surface to surface contact, the combined width of the two walls secured together by a fastening device 14 is not increased by the fastening device. In addition, fastening devices 14 secure building units 12 together in a sturdy manner.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

What is claimed is:

1. A modular system comprising;
(a) a plurality of building units, each having at least one countersunk aperture for alignment with a countersunk aperture of another building unit; and
(b) fastening means for securing said building units together in any of a plurality of configurations to form said modular system, said fastening means including a plurality of fastening devices, each including:
(i) first bolt means for engagement within a first said countersunk aperture;
(ii) second bolt means for engagement within a second said countersunk aperture that is in alignment with said first countersunk aperture;
(iii) nut means positioned within said first and second countersunk apertures for securing said first and second bolt means together; and
(c) at least one of said building units having a configuration of a cube.

2. A modular system comprising;
(a) a plurality of building units, each having at least one countersunk aperture for alignment within a countersunk aperture of another building unit; and
(b) fastening means for securing said building units together in any of a plurality of configurations to form said modular system, said fastening means including a plurality of fastening devices, each including:
(i) first bolt means for engagement within a first said countersunk aperture;
(ii) second bolt means for engagement within a second said countersunk aperture that is in alignment with said first countersunk aperture;
(iii) nut means positioned within said first and second countersunk apertures for securing said first and second bolt means together; and
(c) at least one of said building units having a triangular cross-section configuration.

3. A modular system comprising;
(a) a plurality of building units, each having at least one countersunk aperture for alignment with a countersunk aperture of another building unit; and
(b) fastening means for securing said building units together in any of a plurality of configurations to form said modular system, said fastening means including a plurality of fastening devices, each including:
(i) first bolt means for engagement within a first said countersunk aperture;
(ii) second bolt means for engagement within a second said countersunk aperture that is in alignment with said first countersunk aperture;
(iii) nut means positioned within said first and second countersunk apertures for securing said first and second bolt means together; and
(c) each of said building units being formed from a plurality of walls, and each of said countersunk apertures being formed in the geometric center of a respective wall.

4. A modular system comprising;
(a) a plurality of building units, each having at least one countersunk aperture for alignment with a countersunk aperture of another building unit; and
(b) fastening means for securing said building units together in any of a plurality of configurations to form said modular system, said fastening means including a plurality of fastening devices, each including:
(i) first bolt means for engagement within a first said countersunk aperture;
(ii) second bolt means for engagement within a second said countersunk aperture that is in alignment with said first countersunk aperture;
(iii) nut means positioned within said first and second countersunk apertures for securing said first and second bolt means together;
(c) each said building unit being formed from a plurality of walls, said countersunk apertures being formed through said walls, and
(d) each of said first and second bolt means having a threaded shaft and an enlarged head, said head having a flat upper surface and each said bolt means being dimensioned such that said flat upper surface of said bolt means is substantially flush with a surface of a respective wall when positioned within a countersunk aperture.

5. A modular system according to claim 4, wherein said surface of said respective wall is an inner surface.

6. A modular system according to claim 5, wherein each said countersunk aperture is formed by a first through bore section adjacent to an outer surface of a respective wall and a second through bore section adjacent to an inner surface of the respective wall, said second through bore section having a diameter greater than that of said first through bore section such that an annular shoulder is formed between said first and second through bore sections, and said enlarged head of each of said first and second bolt means rests against a respective annular shoulder when said first and second bolt means are assembled in a respective countersunk aperture.

7. A modular system according to claim 4, wherein the upper surface of the enlarged head of said first and second bolt means has a diametrical slot therein for receipt of a screw driver.

8. A modular system comprising:
(a) a plurality of building units, each having at least one planar wall of square configuration, said planar wall having a countersunk apertue at its geometric center for alignment with a countersunk aperture at the geometric center of said at least one planar wall of square configuration of another building unit;
(b) fastening means for securing at least two of said building units together with said planar walls in surface to surface contacting relations and said countersunk apertures in alignment, said fastening means including male and female fastening elements having heads shaped complementarily to said countersunk aperture, whereby said heads are substantially flush with the exposed surface of said planar walls when said at least two building units are secured together; and
(c) at least one of said building units having the configuration of a cube.

9. A modular system comprising:
(a) a plurality of building units, each having at least one planar wall of square configuration, said planar wall having a countersunk aperture at its geometric center for alignment with a countersunk aperture at the geometric center of said at least one planar wall of square configuration of another building unit;
(b) fastening means for securing at least two of said building units together with said planar walls in surface to surface contacting relations and said countersunk apertures in alignment, said fastening means including male and female fastening elements having heads shaped complementarily to said countersunk aperture, whereby said heads are substantially flush with the exposed surface of said planar walls when said at least two building units are secured together; and
(c) at least one of said building units having a triangular cross-section configuration.

10. A modular system in accordance with claim 9 wherein at least one of said building units has the configuration of a cube.

11. A modular system comprising:
(a) a plurality of building units, each having at least one planar wall of square configuration, said planar wall having a countersunk aperture at its geometric center for alignment with a countersunk aperture at the geometric center of said at least one planar wall of square configuration of another building unit;
(b) fastening means for securing at least two of said building units together with said planar walls in surface to surface contacting relations and said countersunk apertures in alignment, said fastening means including male and female fastening elements having heads shaped complementarily to said countersunk aperture, whereby said heads are substantially flush with the exposed surface of said planar walls when said at least two building units are secured together; and
(c) some of said building units having a triangular cross-section configuration and others of said building units having the configuration of a cube.

12. A modular system comprising:
(a) a plurality of building units, each having at least one planar wall of square configuration, said planar wall having a countersunk aperture at its geometric center for alignment with a countersunk aperture at the geometric center of said at least one planar wall of square configuration of another building unit;
(b) fastening means for securing at least two of said building units together with said planar walls in surface to surface contacting relation and said countersunk apertures in alignment, said fastening means including male and female fastening elements having heads shaped complementary to said countersunk aperture, whereby said heads are substantially flush with the exposed surface of said planar walls when said at least two building units are secured together; and (c) said building units having configuration of a cube.

13. A modular system in accordance with claim 12 wherein said building units comprise a cubical member having five walls and an opening into the cube in lieu of a sixth wall.

14. A modular system comprising:
(a) a plurality of building units, each having at least one planar wall of square configuration, said planar wall having a countersunk aperture at its geometric center for alignment with a countersunk aperture at the geometric center of said at least one planar wall of square configuration of another building unit;
(b) fastening means for securing at least two of said building units together with said planar walls in surface to surface contacting relation with said countersunk apertures in alignment, said fastening means including male and female fastening elements having heads shaped complementary to said countersunk aperture, whereby said heads are substantially flush with the exposed surface of said planar walls than said at least two building units are secured together; and
(c) said building units having a triangular cross-section configuration.

15. A modular system in accordance with claim 14, wherein said building units comprise a half cubical member defined by a square rear wall, a square bottom wall and a pair of triangular sidewalls.

* * * * *